Nov. 19, 1968  L. C. WRIGHT  3,411,316
COOLING SYSTEM FOR VEHICLES HAVING AIR CONDITIONERS
Filed Feb. 6, 1967  2 Sheets-Sheet 1
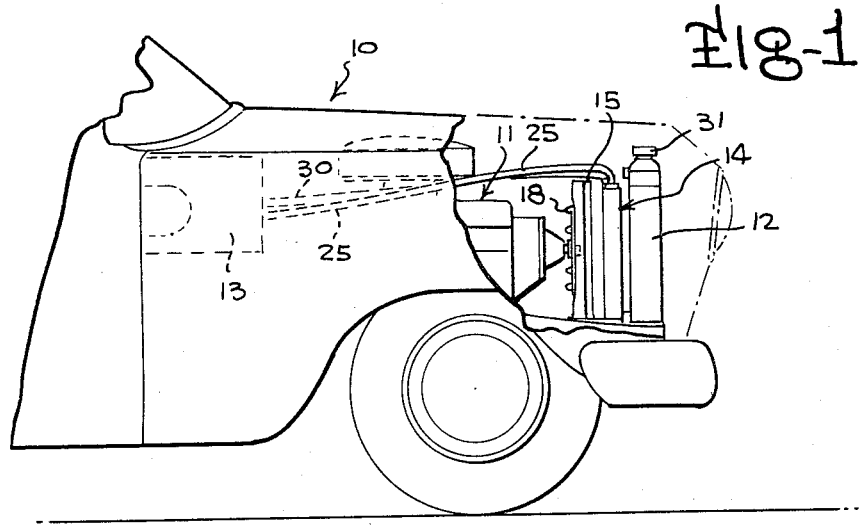
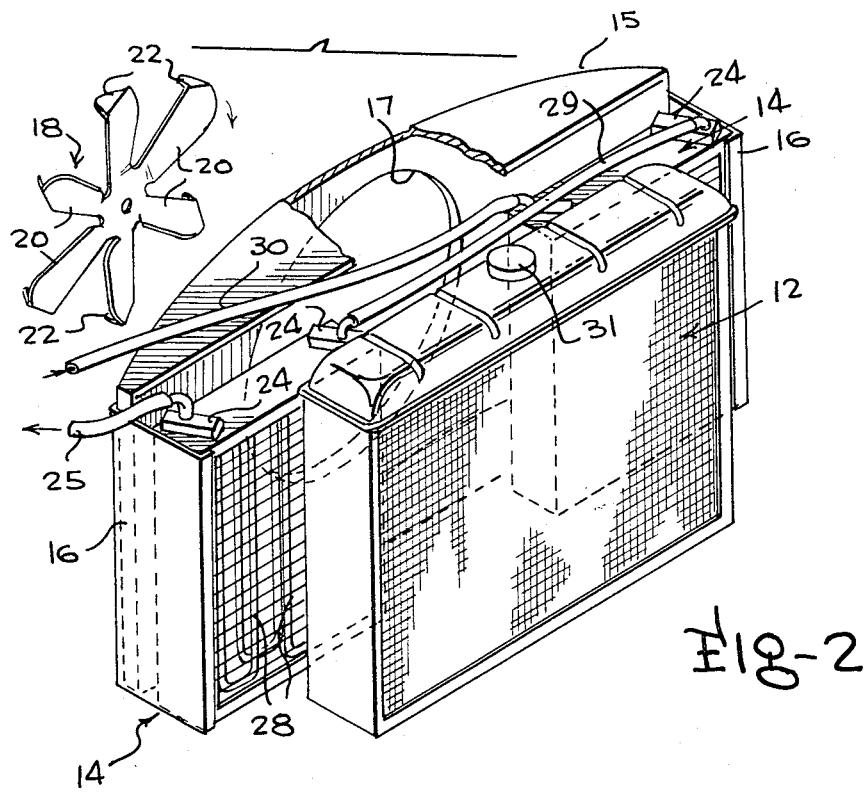
INVENTOR
LEWIS C. WRIGHT
BY *Sherman Levy* ATTORNEY Nov. 19, 1968     L. C. WRIGHT     3,411,316
COOLING SYSTEM FOR VEHICLES HAVING AIR CONDITIONERS
Filed Feb. 6, 1967     2 Sheets-Sheet 2
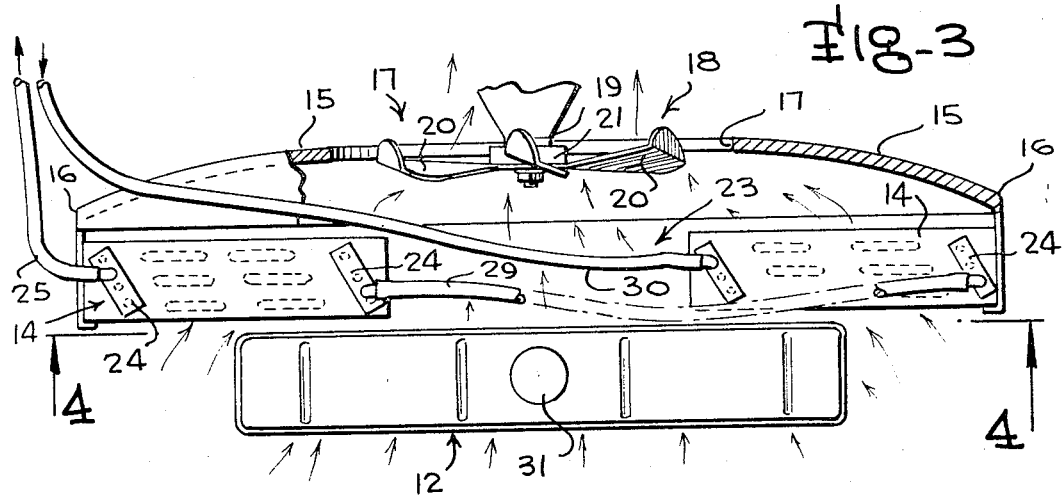
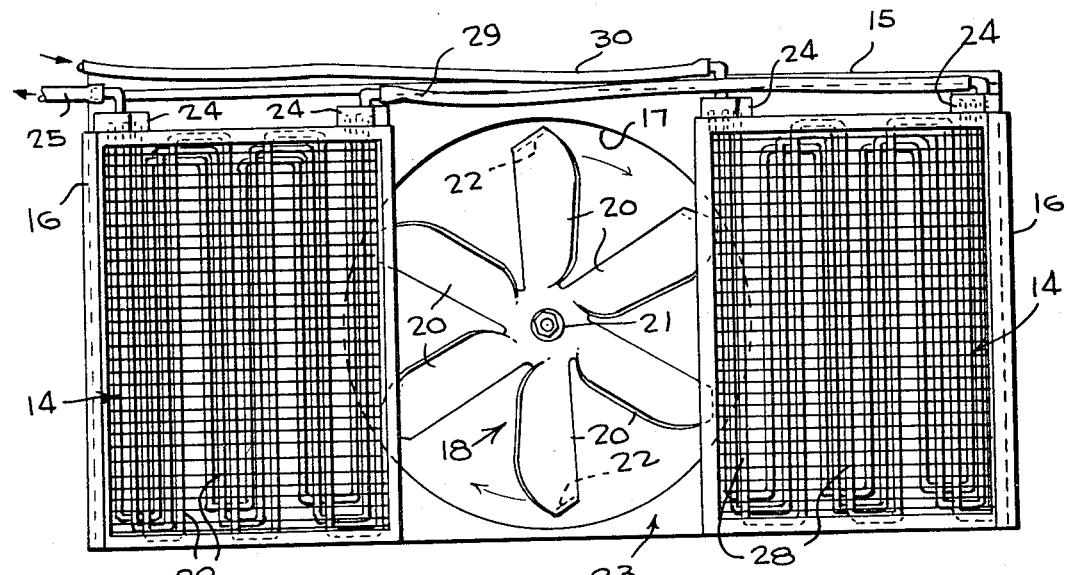
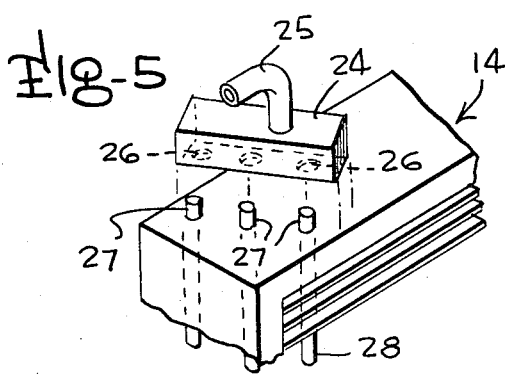
INVENTOR
LEWIS C. WRIGHT
BY Sherman Levy ATTORNEY United States Patent Office 3,411,316
Patented Nov. 19, 1968

3,411,316
COOLING SYSTEM FOR VEHICLES HAVING
AIR CONDITIONERS
Lewis C. Wright, Rte. 1, Box 132,
Valdosta, Ga. 31601
Filed Feb. 6, 1967, Ser. No. 614,152
3 Claims. (Cl. 62—239)

ABSTRACT OF THE DISCLOSURE

A cooling system for vehicles equipped with air conditioners wherein there is provided auxiliary radiators which function in cooperation with a fan to assure that the vehicle air conditioner will be efficiently and properly cooled.

Background of the invention (1) *Field of the invention.*—The present invention pertains to the field of air conditioning and refrigeration as defined in Class 62, subclasses 238, 119.5 and 118; Class 257, subclass 31; and Class 123, subclasses 41.01 and 41.51.

(2) *Description of the prior art.*—The prior art includes the following prior Patents: 2,903,083, 2,906,097, 2,481,135, 2,503,411, 3,171,392, 3,123,056, 2,971,501, 3,080,857.

Some of the differences or advantages that the present invention has over these prior patents is as follows:

The present invention includes a split radiator which provides auxiliary radiator means that are rearwardly and slightly outwardly of the main vehicle radiator, and wherein there is provided a power driven fan of a unique construction and operation which serves to draw or suck air in through the auxiliary radiators instead of drawing of warm air through the auxiliary radiators from the main radiator whereby the vehicle air conditioner will be cooled or operated with increased efficiency and capability.

Summary of the invention

In accordance with the present invention there is provided a cooling system for vehicles of the type having air conditioners wherein there is provided a pair of spaced apart auxiliary radiators that are arranged just to the rear of the vehicle main radiator, and wherein the auxiliary radiators are arranged in spaced apart relation with respect to each other, and the auxiliary radiators are also spaced outwardly beyond the side edges of the main radiator, and wherein there is provided a power driven fan which assures that the auxiliary radiators will receive air that has not been previously heated or warmed by the main radiator so that the auxiliary radiators can be used to cool the vehicle air conditioner in such a manner that overheating of the vehicle air conditioner will be prevented.

Brief description of the drawings

FIG. 1 is a side elevational view, with parts broken away and in section, illustrating the present invention, and showing the cooling system for vehicles having air conditioners.

FIG. 2 is a perspective view, with parts separated for clarity of illustration.

FIG. 3 is a fragmentary top plan view.

FIG. 4 is a sectional view taken on the line 4—4 of FIG. 3.

FIG. 5 is an enlarged perspective view of certain constructional details of the present invention.

Description of the preferred embodiment

Referring in detail to the drawings, the numeral 10 indicates a portion of a conventional vehicle such as an automobile, FIG. 1, and the automobile or vehicle 10 includes the usual engine or motor 11. The numeral 12 indicates the conventional main radiator for the vehicle, and the numeral 13 indicates schematically the air conditioner for the vehicle.

In accordance with the present invention, there is provided an improved cooling system for vehicles which have air conditioners, and the cooling system of the present invention includes a pair of spaced apart auxiliary or split radiators 14 which are interposed between the main radiator 12 and the engine 11, as shown in the drawings. The pair of auxiliary radiators 14 are arranged in spaced apart relation with respect to each other so there is provided or defined a space 23 therebetween, FIG 3. In addition, the auxiliary radiators 14 are offset or spaced outwardly, as shown in the drawings, for a purpose to be later described so that the outer vertical side edges of the auxiliary radiators 14 are arranged or disposed outwardly beyond the outer vertical side edges of the main radiator 12.

The numeral 16 indicates a bracket assembly which is suitably connected to the auxiliary radiators 14, and a body member or mounting member 15 may be supported by the bracket assembly 16. The body member 15 is provided with a suitable opening 17 therein, FIG. 2, and the numeral 18 indicates a power driven fan which is arranged slightly to the rear of the body member 15, and the fan 18 is arranged in alignment with the opening 17. The fan 18 has a unique construction and includes a centrally disposed hub portion 21 as well as laterally disposed blades or arms 20 which are slightly offset or arranged at an angle with respect to the hub, and, in addition, there is provided angularly disposed flanges or lugs 22 on the outer end portions of the blades 20.

As shown in FIG. 1, there is provided fittings 24, and a coolant line or conduit 25 is adapted to supply or convey the coolant to the air conditioner 13 from the coils 28 of the auxiliary radiators 14, and the fittings 24 are constructed so that one line such as the line 25 communicates with a plurality of coils or lines 28, through the medium of extensions 27 on the coils 28 which communicate with apertures or openings 26 in the fittings 24. The coolant flows from the inside to the outside of both auxiliary radiators.

In the auxiliary radiators the coils 28 are arranged in a generally vertical manner instead of being horizontally disposed as in conventional radiators. The flow path for the air conditioner coolant may be substantially as follows:

The coolant from the air conditioner 13 enters an auxiliary radiator 14 through the line 30, and then flows through the coils 28 in one of the auxiliary radiators and this coolant then flows out through the line 29 into the other auxiliary radiator 14 and from this last named radiator 14 the coolant flows out through a line or conduit 25 to the air conditioner 13.

From the foregoing it will be seen that there has been provided a cooling system for vehicles such as automobiles that are provided with air conditioners, and the present invention will prevent overheating of such air conditioners in the desired manner. In use, with the parts arranged as shown in the drawings, it will be seen that the main radiator 12 which has the usual filling cap 31 thereon will function in the usual manner to cool the internal combustion engine 11. Thus, this is brought about due to the fact that air moves through the main radiator 12, as shown in FIG. 3, from front to rear, and this air can move rearwardly through the space 23 between the auxiliary radiators 14 in the desired manner.

Due to the fact that the auxiliary radiators 14 are offset outwardly from the main radiator 12, it will be seen that some of the air that goes through the auxiliary radiators 14 will not have passed through the main radiator 12 because, as shown in the drawings, the outer side portions of the auxiliary radiators 14 are not covered by the main radiator 12. This has the important advantages of assuring that the air for the air conditioner that circulates through the coils 28 will be relatively cool air instead of using the warm air from the main radiator 12 to circulate through auxiliary radiators 14. In addition, the fan 18 is arranged contiguous to the opening 17 in the body member 15, and the fan 18 has the especially constructed blades 19 and flanges 22 and due to this construction of the fan 18 the air will be sucked through the radiators in the desired manner. That is, at least some of the air for cooling the auxiliary radiators 14 will be fresh air which enters the radiators 14 through the portion of the radiators 14 that is not covered by the main radiator 12, and this air flowing through the auxiliary radiators 14 can move slightly laterally inwardly through the space 23 and the opening 17 due to the arrangement of the parts and the specific construction of the blades 19 and flanges 22. The fan 18 is adapted to be driven in the usual manner by a power shaft 19 on the engine 11.

It is to be understood that the necessary conduits and lines are provided for causing the coolant fluid to circulate through the auxiliary radiators 14 and for example an inlet line 30 is adapted to lead from the air conditioner unit 13 to one upper end portion of an auxiliary radiator 14 and from the line 25 the coolant separates into a plurality of individual lines or coils 28 to help increase the cooling effect.

The coolant is adapted to flow outwardly through the line 29 into the other auxiliary radiator 14 and after traveling through this last named radiator 14 the coolant returns.

The parts can be made of any suitable material and in different shapes or sizes.

The number of blades 20 and the fan 18 can be varied as desired. Vehicles such as automobiles having air conditioning, often develop overheating problems, especially when they are creeping along in traffic. The present invention due to the split radiators 14, as well as the outwardly offset arrangement of the radiators 14 and the provision of the fan 18, together with the previously described parts, overcomes this difficulty. The air is sucked in a desired manner to accomplish the cooling through the auxiliary radiators.

The vent or shield 15 forces the fan 18 to pull air through the auxiliary radiators in the desired manner, and the shield or body member 16 is substantially closed all the way around except for the opening 17 therein.

Heretofore with conventional radiators and cooling systems in vehicles, there has been a problem inasmuch as the single radiators had a tendency to heat up, but the present invention overcomes this difficulty or problem.

The present invention does not affect the normal operation of the radiators and the vehicle can still be operated in the desired manner with or without the air conditioner being operated. In the auxiliary radiators the coolant fluid flows from the inside to the outside of both auxiliary radiators. The body member or vent 15 is very important because it channels the flow of air in the proper direction. Also in the present invention regular water can be used as the coolant instead of commercial coolants.

Minor changes in shape, size and rearrangements of details coming within the field of invention claimed may be resorted to in actual practice, if desired.

What is claimed is:

1. In a cooling system in a vehicle, a main radiator, a pair of split condensers arranged rearwardly and offset outwardly from the main radiator, and a fan positioned rearwardly of the condensers.

2. The structure as defined in claim 1, and further including a body member arranged rearwardly of said condensers, and said body member having an opening therein, said fan being arranged in alignment with said opening.

3. In a vehicle, an engine, a main radiator positioned forwardly of said engine, an air conditioner for said vehicle, and a cooling system for said air conditioner, said cooling system comprising a pair of condensers spaced rearwardly of said main radiator, and said condensers being interposed between said main radiator and said engine, said condensers being spaced outwardly and offset outwardly from the main radiator, and wherein said condensers are arranged in spaced apart relation with respect to each other, a body member arranged adjacent to the rear of said condensers, there being an opening in the intermediate portion of said body member, a fan arranged in alignment with the opening in said body member, a said fan including a central hub, a plurality of laterally disposed blades extending from said hub, said blades being offset slightly and having angularly arranged flanges on their outer end whereby air is sucked in from the condensers through the opening in the body member, said condensers including vertically disposed coils, fittings connected to said coils, and coolant lines operatively connected to said fittings and to said air conditioner.

References Cited

UNITED STATES PATENTS

| | | | |
|---|---|---|---|
| 2,774,220 | 12/1956 | Heym | 62—244 |
| 3,087,312 | 4/1963 | White | 62—244 |
| 3,218,821 | 11/1965 | Spatt | 62—244 |
| 3,306,067 | 2/1967 | Anglin | 62—243 |

WILLIAM J. WYE, *Primary Examiner.*